(12) United States Patent
Fujikawa (10) Patent No.: US 11,060,555 B2
(45) Date of Patent: Jul. 13, 2021

(54) HYDROSTATIC BEARING TYPE SPINDLE DEVICE AND MACHINE TOOL INCLUDING THE HYDROSTATIC BEARING TYPE SPINDLE DEVICE

(71) Applicant: SODICK CO., LTD., Kanagawa (JP)

(72) Inventor: Misao Fujikawa, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 0 days.

(21) Appl. No.: 16/816,297

(22) Filed: Mar. 12, 2020

(65) Prior Publication Data
US 2020/0291989 A1 Sep. 17, 2020

(30) Foreign Application Priority Data
Mar. 15, 2019 (JP) .............................. JP2019-047935

(51) Int. Cl.
*F16C 17/10* (2006.01)
*F16C 32/06* (2006.01)
(Continued)

(52) U.S. Cl.
CPC .............. *F16C 17/107* (2013.01); *B23Q 1/70* (2013.01); *F16C 32/0659* (2013.01);
(Continued)

(58) Field of Classification Search
CPC F16C 17/107; F16C 32/0644; F16C 32/0662; F16C 32/0659; F16C 32/0696;
(Continued)

(56) References Cited

U.S. PATENT DOCUMENTS

| 3,380,641 A | * | 4/1968 | Deemie | ................. B23K 20/12 228/2.3 |
| 3,454,309 A | | 7/1969 | Ingham et al. | |

(Continued)

FOREIGN PATENT DOCUMENTS

| CH | 631909 A5 | * | 9/1982 | .......... F16C 32/0659 |
| DE | 2839858 A | * | 9/1978 | ................ B23P 1/70 |

(Continued)

OTHER PUBLICATIONS

"Office Action of India Counterpart Application", dated Apr. 1, 2021, p. 1-p. 5.

*Primary Examiner* — Marcus Charles
(74) *Attorney, Agent, or Firm* — JCIPRNET (57) ABSTRACT

A hydrostatic bearing spindle device includes: a spindle includes tapered portion having tapered radial receiving surface and flange having first thrust receiving surface and second thrust receiving surface formed at rear side from first thrust receiving surface; first thrust bearing has first thrust bearing surface facing first thrust receiving surface; second thrust bearing has second thrust bearing surface facing second thrust receiving surface; radial bearing facing tapered radial receiving surface; rotation regulator regulates relative rotation of one of first thrust bearing and second thrust bearing with respect to the other; and housing has first screw groove which is screwed with first thrust bearing and second screw groove which is screwed with second thrust bearing. Second screw groove has larger screw pitch than first screw groove does when tapered portion expands rearward, and first screw groove has larger screw pitch than second screw groove does when tapered portion expands frontward.

10 Claims, 5 Drawing Sheets

(51) Int. Cl.
*B23Q 1/70* (2006.01)
*F16C 35/08* (2006.01)

(52) U.S. Cl.
CPC .......... *F16C 32/0696* (2013.01); *F16C 35/08* (2013.01); *F16C 2322/39* (2013.01)

(58) Field of Classification Search
CPC ... F16C 2322/39; B23P 15/003; B23P 11/027; B23Q 1/70; B23Q 1/50; B23Q 1/56; B23Q 11/0883
USPC .......... 384/107, 131, 114, 121, 188; 82/147; 451/294
See application file for complete search history.

(56) References Cited

U.S. PATENT DOCUMENTS

| | | | | |
|---|---|---|---|---|
| 4,566,226 A | * | 1/1986 | Kimura | B23Q 15/18 408/16 |
| 5,073,037 A | * | 12/1991 | Fujikawa | F16C 32/0614 384/120 |
| 5,449,235 A | * | 9/1995 | Buckmann | F16C 32/0659 384/108 |
| 5,833,522 A | * | 11/1998 | Niino | B23Q 1/38 451/294 |
| 6,419,396 B1 | * | 7/2002 | Raess | B23Q 1/70 384/107 |
| 6,793,395 B1 | * | 9/2004 | Studemann | B23Q 1/70 384/101 |
| 2004/0035967 A1 | * | 2/2004 | Johnson | B02C 2/04 241/207 |
| 2009/0133546 A1 | * | 5/2009 | Araie | B23H 7/26 82/146 |
| 2011/0081216 A1 | * | 4/2011 | Ogura | B23Q 11/0039 409/141 |
| 2012/0110818 A1 | * | 5/2012 | Kashchenevsky | F16C 32/0659 29/428 |
| 2014/0029877 A1 | * | 1/2014 | Kashchenevsky | F16C 32/064 384/107 |
| 2016/0215818 A1 | * | 7/2016 | Yamato | B23P 15/003 |
| 2016/0229027 A1 | * | 8/2016 | Stra er | B24B 41/066 |

FOREIGN PATENT DOCUMENTS

| | | | |
|---|---|---|---|
| DE | 102016100996 A1 * | 7/2016 | ............ B23P 15/003 |
| EP | 2308635 | 11/2012 | |
| FR | 2675863 A1 * | 10/1992 | .......... F16C 32/0659 |
| JP | S62112319 | 7/1987 | |
| JP | H0828566 | 2/1996 | |
| JP | 2006167822 A * | 6/2006 | |
| JP | 2014134288 A * | 7/2014 | ............... B60K 6/12 |
| JP | 5925437 B2 * | 5/2016 | ............... F16C 32/06 |
| JP | 2016172314 A * | 9/2016 | ............... B23B 19/02 |

* cited by examiner

ND MACHINE TOOL INCLUDING
HYDROSTATIC BEARING TYPE SPINDLE DEVICE AND MACHINE TOOL INCLUDING THE HYDROSTATIC BEARING TYPE SPINDLE DEVICE

CROSS REFERENCE TO RELATED APPLICATION

The present invention claims priority under 35 U.S.C. § 119 to Japanese Application No. 2019-047935 filed Mar. 15, 2019, the entire content of which is incorporated herein by reference.

BACKGROUND OF THE DISCLOSURE

Technical Field

The present invention relates to a machine tool that processes a workpiece by a tool attached to a spindle directly or with a tool holder, and particularly relates to a hydrostatic bearing spindle device in which a hydrostatic bearing rotatably supports a spindle with a fluid in a non-contact manner.

Related Art

A hydrostatic bearing device supports a rotating spindle with a fluid in a non-contact manner. For example, patent literature 1 (Japanese Utility Model Laid-Open No. 62-112319) and patent literature 2 (Japanese Patent Laid-Open No. 08-028566) disclose a hydrostatic bearing device that supports loads of thrust loading and radial loading which are applied to a spindle.

In the hydrostatic bearing disclosed in patent literature 1 (Japanese Utility Model Laid-Open No. 62-112319), a flange and tapered portions are formed on a rotary spindle. The tapered portions are formed at both sides of the flange. The thrust loading is supported by a fluid supplied from thrust loading bushes which are disposed at both sides of the flange. The radial loading is supported by a fluid supplied from radial loading bushes which face the tapered portions, respectively. The thrust loading bushes are accommodated in a housing with a thrust gap adjusting liner interposed therebetween. The radial loading bushes are accommodated in the thrust loading bush with a radial gap adjusting liner interposed therebetween. The rotary spindle is accommodated in the radial loading bushes. A gap distance between the flange and the thrust loading bush is determined by a size of the thrust gap adjusting liner. A gap distance between the tapered portion and the radial loading bush is determined by a size of the radial gap adjusting liner. The thrust gap adjusting liner and the radial gap adjusting liner having suitable sizes are appropriately selected when the device is assembled.

In the hydrostatic bearing device disclosed in patent literature 2 (Japanese Patent Laid-Open No. 08-028566), a radial loading of a main spindle is supported by a fluid supplied from a movable sleeve which faces a tapered outer-circumferential portion of the main spindle. The movable sleeve is movable in an axial direction of the main spindle. A gap distance between the tapered outer-circumferential portion and the movable sleeve is variable depending on movement of the movable sleeve. In order to temporarily increase stiffness of the main spindle when the radial loading of the main spindle is high, the gap distance between the tapered outer-circumferential portion and the movable sleeve is shortened. In order to inhibit the main spindle from generating heat when the radial loading of the main spindle is low, the gap distance between the tapered outer-circumferential portion and the movable sleeve is lengthened. The thrust loading of the main spindle is supported by the fluid. The fluid is supplied from a bush which is fixed at one side of a thrust receiving flange of the main spindle and a positioning member which is fixed at the other side of the thrust receiving flange.

In the hydrostatic bearing disclosed in patent literature 1 (Japanese Utility Model Laid-Open No. 62-112319), when the gap distance between the flange and the thrust loading bush and the gap distance between the tapered portion and the radial loading bush are adjusted, the device needs to be disassembled to replace the gap adjusting liners.

In patent literature 2 (Japanese Patent Laid-Open No. 08-028566), the hydrostatic bearing device does not have a mechanism that adjusts the gap distance between the thrust receiving flange and the bush or a mechanism that adjusts the gap distance between the thrust receiving flange and the positioning member.

In a hydrostatic bearing spindle device, it is desirable that both a gap distance at a thrust side and a gap distance at a radial side can be easily adjusted. In particular, in the hydrostatic bearing spindle device, it is desirable to decrease both gap distances so as to increase stiffness when a load applied to a spindle is high and a rotational speed of the spindle is slow and to increase both gap distances so as to decrease frictional heat when a load applied to the spindle is low and the rotational speed of the spindle is fast. In addition, the hydrostatic bearing spindle device is mounted at a machining head of a machine tool, and thus it is desirable that the hydrostatic bearing spindle device has a small and simple configuration.

Therefore, an object of the invention is to provide a hydrostatic bearing spindle device having a small and simple configuration in which it is possible to easily adjust both a gap distance at a thrust loading side and a gap distance at a radial loading side. Additional objects and advantages of the invention will be set forth in the description that follows.

SUMMARY

The invention relates to a hydrostatic bearing spindle device to which a tool or a workpiece is detachably fixed. The hydrostatic bearing spindle device includes:
 a spindle that is configured to have a front end to which the tool or the workpiece is detachably fixed and that includes a tapered portion having a tapered radial receiving surface and a flange having a first thrust receiving surface and a second thrust receiving surface formed at a rear side from the first thrust receiving surface;
 a spindle rotation driving device that rotates the spindle;
 a first thrust bearing that has a first thrust bearing surface facing the first thrust receiving surface in parallel with a first gap formed therebetween and that is penetrated by the spindle;
 a second thrust bearing that has a second thrust bearing surface facing the second thrust receiving surface in parallel with a second gap formed therebetween and that is penetrated by the spindle;
 a radial bearing that has a tapered radial bearing surface facing the tapered radial receiving surface in parallel with a third gap formed therebetween and that is penetrated by the spindle;
 a rotation regulator that allows one of the first thrust bearing and the second thrust bearing to relatively move with respect to the other in an axial direction but regulates relative rotation of the one with respect to the other; and a housing which has a first screw groove screwed with the first thrust bearing and a second screw groove screwed with the second thrust bearing and accommodates the spindle, the first thrust bearing, the second thrust bearing, and the radial bearings and to which the radial bearing is fixed.

The second screw groove has a larger screw pitch than the first screw groove does when the tapered portion expands rearward, and the first screw groove has a larger screw pitch than the second screw groove does when the tapered portion expands frontward.

BRIEF DESCRIPTION OF THE DRAWINGS

The hydrostatic bearing spindle device of the invention has a small and simple configuration, in which it is possible to easily adjust both a gap distance at a thrust loading side and a gap distance at a radial loading side.

DESCRIPTION OF THE EMBODIMENTS

Hereinafter, hydrostatic bearing devices according to embodiments of the invention will be described in detail with reference to the drawings. Moreover, configurational members and spaces between the configurational members shown in the drawings are illustrated to have a partially emphasized dimension and shape for convenience of description. In an illustrated example, a lower end of a spindle is a front end of the spindle, and an upper end of the spindle is a rear end of the spindle. Frontward movement of the spindle indicates downward movement of the spindle. Rearward movement of the spindle indicates upward movement of the spindle.

A spindle 2 rotates around an axis in a housing 6 and moves in an axial direction in the housing 6. The spindle 2 is configured to have a front end to which a tool 7 is detachably attached directly or by a suitable tool holder. The tool 7 rotates together with the spindle 2 and moves frontward and rearward together with the spindle 2. Instead of the tool 7, a workpiece may be fixed to the spindle 2. An attachment hole 24 extending in the axial direction is formed at a rear end of the spindle 2. A rotary rod 80 of a spindle rotation driving device 8 is inserted coaxially with the spindle 2 into the attachment hole 24. The spindle rotation driving device 8 rotates the spindle 2. The spindle rotation driving device 8 is not limited to an electric motor, and various types of rotation driving devices such as an air spindle can be employed.

The spindle 2 has a key member 25 which extends in a radial direction at an inner circumference of the attachment hole 24. A guide groove 81 is formed in an outer circumference of the rotary rod 80 so as to guide the key member 25 in the axial direction of the spindle 2. The key member 25 and the guide groove 81 allow the spindle 2 to relatively move in the axial direction with respect to the rotary rod 80 and regulate relative rotation of the spindle 2 with respect to the rotary rod 80. The spindle 2 is movable in the axial direction with respect to the rotary rod 80. The spindle 2 is rotatable together with the rotary rod 80.

A flange 21 is formed at a part of an outer circumferential surface of the spindle 2. The flange 21 has a first thrust receiving surface 22 and a second thrust receiving surface 23 formed at a rear side from the first thrust receiving surface 22, the first thrust receiving surface and the second thrust receiving surface being formed in parallel with each other.

A frustoconical tapered portion 20 expanding rearward is formed at the front end of the spindle 2. The tapered portion 20 has a tapered radial receiving surface 20a on an outer circumferential surface thereof. An outer diameter of the tapered portion 20 gradually increases rearward. Regarding the tapered portion 20, d1 represents a minimum outer diameter, d2 represents a maximum outer diameter, and h represents a height. A taper ratio T of the tapered portion 20 is obtained by dividing a difference between the outer diameters d2 and d1 by the height h as follows.

$$T=(d2-d1)/h$$

The taper ratio T of the tapered portion 20 may be 1/50 to 1/10.

The spindle 2 is supported in the housing 6. Mainly, a first thrust bearing 3 and a second thrust bearing 4 hydrostatically receives loading of the spindle 2 in a thrust direction in a non-contact manner. Mainly, a radial bearing 5 hydrostatically receives loading of the spindle 2 in a radial direction in a non-contact manner.

The first thrust bearing 3 which is penetrated by the spindle 2 is accommodated coaxially with the spindle 2 in the housing 6. The first thrust bearing 3 has a circular cylinder shape or a circular ring shape. The first thrust bearing 3 has a first thrust bearing surface 30, and the first thrust bearing surface 30 faces the first thrust receiving surface 22 of the flange 21 in parallel with a first gap S1 formed therebetween. The first thrust bearing surface 30 and the first thrust receiving surface 22 are parallel with each other. A size of the first gap S1 is a distance in a perpendicular direction to both the first thrust bearing surface 30 and the first thrust receiving surface 22.

Figure 1:
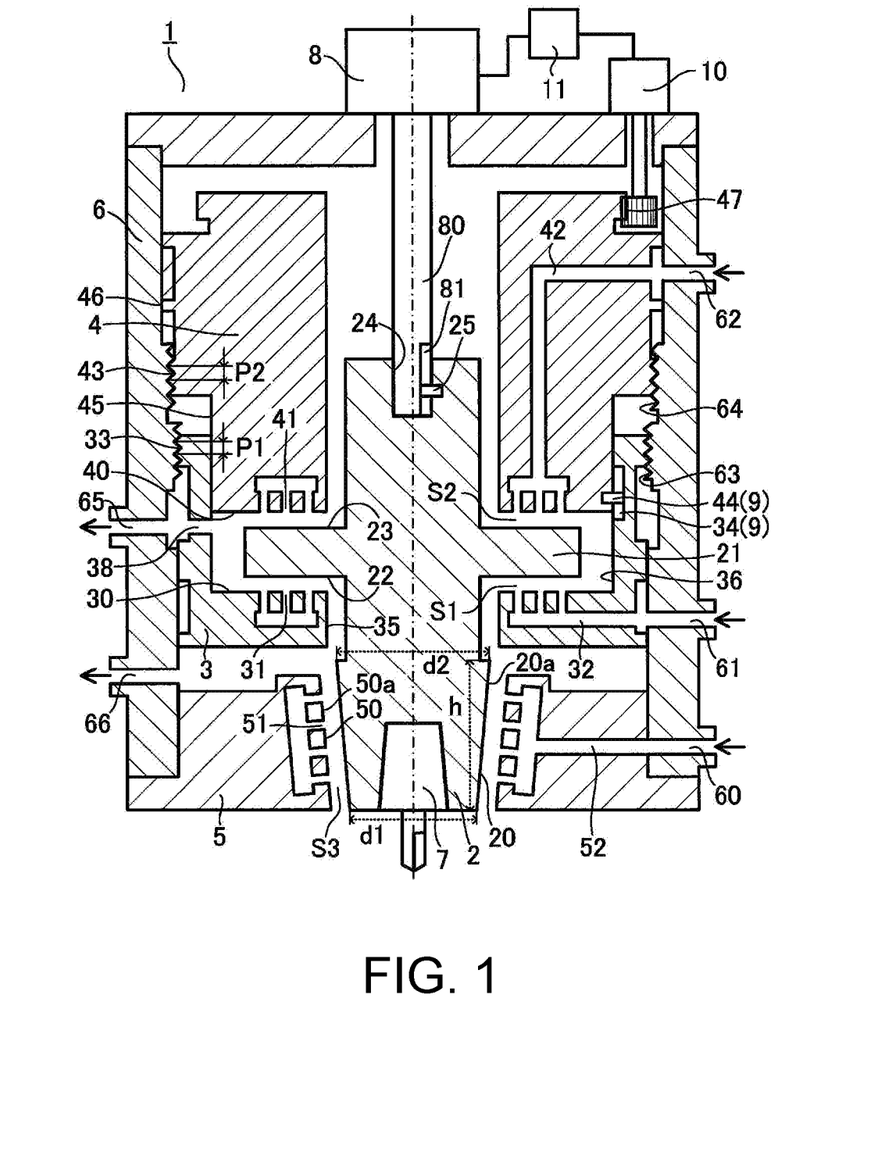
FIG. 1 is a front cross-sectional view schematically illustrating a hydrostatic bearing spindle device according to a first embodiment of the invention, in a state that a gap distance at a thrust loading side and a gap distance at a radial loading side are large.

As illustrated in FIG. 1, in the first thrust bearing 3, an inner circumferential surface 35 facing the outer circumferential surface of the spindle 2 is formed between the flange 21 and the tapered portion 20. In addition, the first thrust bearing 3 has an inner circumferential surface 36 facing an outer circumferential surface of the flange 21. The first thrust bearing surface 30 of the first thrust bearing 3 is perpendicular to the inner circumferential surface 35 and the inner circumferential surface 36.

The first thrust bearing surface 30 has at least one first fluid outlet 31 from which a fluid is ejected toward the first thrust receiving surface 22 of the flange 21. The first fluid outlet 31 is connected to first fluid supply piping 32 formed in the first thrust bearing 3. The first fluid supply piping 32 is connected to a first fluid supply port 61 that is open at an outer circumference of the housing 6. The first fluid supply port 61 is connected to a fluid supply device not illustrated. The fluid supply device supplies a fluid to the first gap S1 via the first fluid supply port 61, the first fluid supply piping 32, and the first fluid outlet 31. The fluid may be air for example.

Fluid discharge piping 38 may be formed to discharge, to the outside of the housing 6, a fluid in a gap formed between the inner circumferential surface 36 of the first thrust bearing 3 and the outer circumferential surface of the flange 21. The fluid discharge piping 38 is connected to a first fluid discharge port 65 that is open at an outer circumferential surface of the housing 6.

A first screw groove 63 and a second screw groove 64 formed at a rear side from the first screw groove 63 are formed at a part of an inner circumferential surface of the housing 6. A screw groove 33 is formed at a part of an outer circumferential surface of the first thrust bearing 3. The screw groove 33 of the first thrust bearing 3 is screwed with the first screw groove 63.

A guide groove 34 is formed in the inner circumferential surface 36 of the first thrust bearing 3. The guide groove 34 guides a key member 44 of the second thrust bearing 4 in parallel with an axis of the spindle 2.

The second thrust bearing 4 which is penetrated by the spindle 2 is accommodated coaxially with the spindle 2 in the housing 6. The second thrust bearing 4 has a circular cylinder shape or a circular ring shape. The second thrust bearing 4 has a second thrust bearing surface 40, and the second thrust bearing surface 40 faces the second thrust receiving surface 23 of the flange 21 with a second gap S2 formed therebetween. The second thrust bearing surface 40 and the second thrust receiving surface 23 are parallel with each other. A size of the second gap S2 is a distance in a perpendicular direction to both the second thrust bearing surface 40 and the second thrust receiving surface 23.

As illustrated in FIG. 1, the second thrust bearing 4 has, at a front portion thereof, a notch in which a rear portion of the first thrust bearing 3 is received. The inner circumferential surface 36 of the first thrust bearing 3 comes into sliding contact with an outer circumferential surface 45 of the front portion of the second thrust bearing 4. A rear portion of the second thrust bearing 4 has a larger diameter than the front portion of the second thrust bearing 4 does.

The second thrust bearing surface 40 has at least one second fluid outlet 41 from which a fluid is ejected toward the second thrust receiving surface 23. The second fluid outlet 41 is connected to second fluid supply piping 42 formed in the second thrust bearing 4. The second fluid supply piping 42 is connected to a second fluid supply port 62 that is open at the outer circumference of the housing 6. The second fluid supply port 62 is connected to a fluid supply device (not illustrated) which is the same as or different from the fluid supply device to which the first fluid supply port 61 is connected. The fluid supply device supplies air to the second gap S2 via the second fluid supply port 62, the second fluid supply piping 42, and the second fluid outlet 41.

A screw groove 43 is formed in an outer circumferential surface 46 of the rear portion of the second thrust bearing 4. The screw groove 43 of the second thrust bearing 4 is screwed with the second screw groove 64 formed at a part of the inner circumferential surface of the housing 6.

The key member 44 extending in the radial direction is fixed to the outer circumferential surface 45 of the second thrust bearing 4. The key member 44 is guided along the guide groove 34 of the first thrust bearing 3. The key member 44 and the guide groove 34 are examples of a rotation regulator 9. Various methods and various mechanisms can be employed for the rotation regulator 9, as long as it is possible to allow the first thrust bearing 3 to move in the axial direction with respect to the second thrust bearing 4 or to regulate relative rotation of the first thrust bearing 3 with respect to the second thrust bearing 4. The first thrust bearing 3 is movable in the axial direction with respect to the second thrust bearing 4. The first thrust bearing 3 is rotatable together with the second thrust bearing 4.

A teeth form 47 is formed at a part of an outer circumference of the second thrust bearing 4. The teeth form 47 of the second thrust bearing 4 intermeshes with a teeth form of a drive shaft of a thrust bearing rotation driving device 10. The thrust bearing rotation driving device 10 rotates the second thrust bearing 4. The rotating second thrust bearing 4 rotates the first thrust bearing 3 by the rotation regulator 9.

Figure 5:
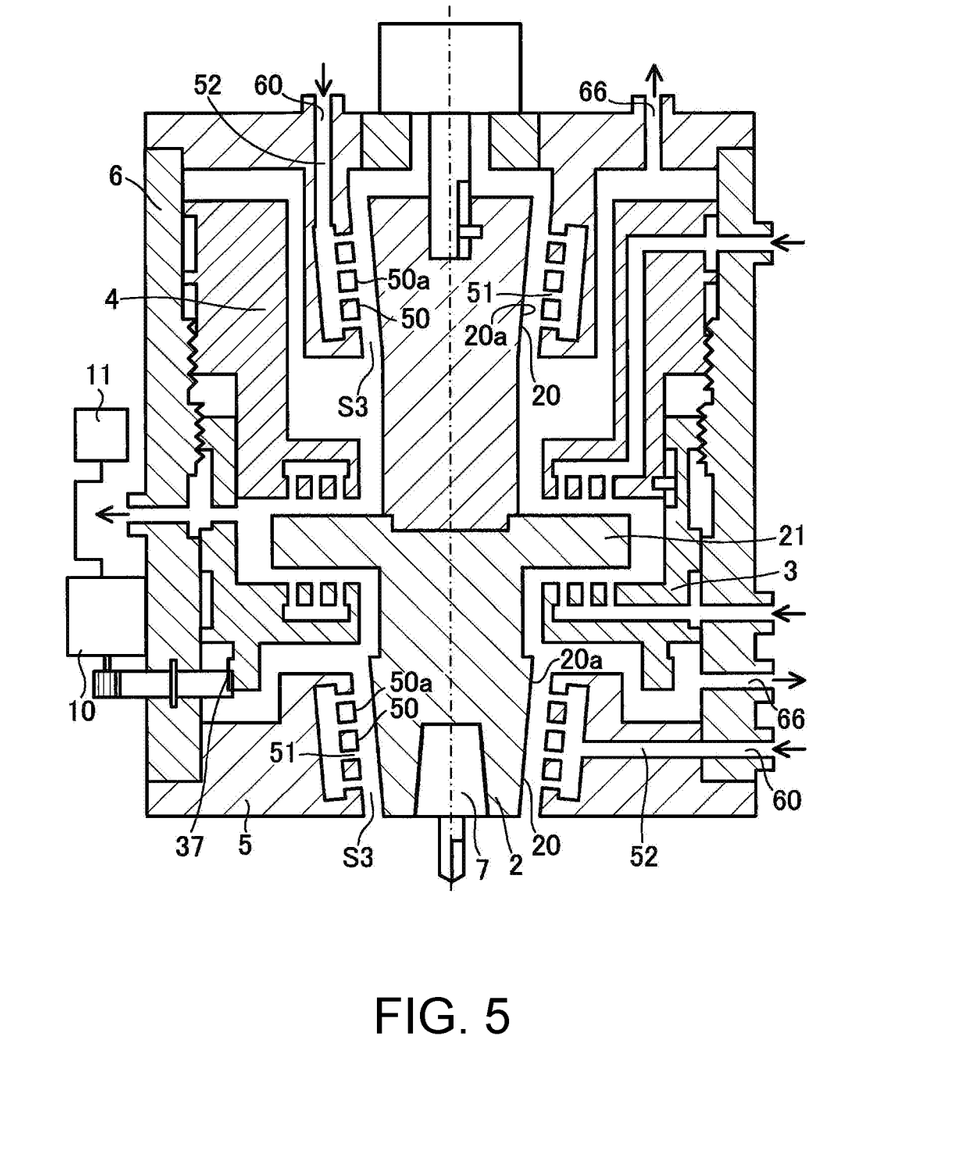
FIG. 5 is a front cross-sectional view schematically illustrating a hydrostatic bearing spindle device according to a third embodiment of the invention, in a state that a gap distance at a thrust loading side and a gap distance at a radial loading side are large.

The thrust bearing rotation driving device 10 may rotate the first thrust bearing 3 in which a teeth form 37 is formed at a part of an outer circumference as illustrated in FIG. 5 described later, via a rotation transmission unit such as a gear. The first thrust bearing 3 may rotate the second thrust bearing 4 by the rotation regulator 9. The thrust bearing rotation driving device 10 is not limited to an electric motor, and various types of rotation driving devices such as a fluid motor or a manual rotation driving mechanism unit can be employed. In addition, as the thrust bearing rotation driving device 10, a rotation driving device in which a linear drive device such as a piston cylinder and a rack and pinion are assembled may be employed, for example. The thrust bearing rotation driving device 10 may be controlled by a control device 11. The control device 11 may control the thrust bearing rotation driving device 10 such that the first thrust bearing 3 or the second thrust bearing 4 perform frontward rotation or reverse rotation by a predetermined number of rotations so as to move frontward or rearward by a predetermined distance. Here, regarding the number of rotations, 0.5 rotation means rotating by 180 degrees, one rotation means rotating by 360 degrees, and 10.25 rotations mean repeatedly performing one rotation for ten times and further rotating by 90 degrees.

The radial bearing 5 which is penetrated by the spindle 2 is fixed coaxially with the spindle 2 in the housing 6. The radial bearing 5 has a circular cylinder shape or a circular ring shape. The radial bearing 5 has a tapered hole 50 having a shape complementary to the tapered portion 20. The radial bearing 5 has a tapered radial bearing surface 50a facing the tapered radial receiving surface 20a of the tapered portion 20 in parallel with a third gap S3 formed therebetween. A size of the third gap S3 is a distance in a perpendicular direction to both the tapered radial bearing surface 50a and the tapered radial receiving surface 20a. A taper ratio of the tapered hole 50 may be equal to the taper ratio T of the tapered portion 20.

The tapered radial bearing surface 50a has at least one third fluid outlet 51 from which a fluid is ejected toward the tapered radial receiving surface 20a. The third fluid outlet 51 is connected to third fluid supply piping 52 formed in the radial bearing 5. The third fluid supply piping 52 is connected to a third fluid supply port 60 that is open at the outer circumference of the housing 6. The third fluid supply port 60 is connected to a fluid supply device (not illustrated) which is the same as or different from the fluid supply device to which the first fluid supply port 61 and the second fluid supply port 62 are connected. The fluid supply device supplies air to the third gap S3 via the third fluid supply port 60, the third fluid supply piping 52, and the third fluid outlet 51.

The housing 6 has a circular cylinder shape, for example. The spindle 2, the first thrust bearing 3, the second thrust bearing 4, and the radial bearing 5 are accommodated in an inner hole of the housing 6. The first fluid supply port 61, the second fluid supply port 62, and the third fluid supply port 60 for supplying a fluid to the inner first fluid supply piping 32, 42, and 52 from outside are formed in the outer circumference of the housing 6. The first fluid supply port 61, the second fluid supply port 62, and the third fluid supply port 60 are connected to a fluid supply device (not illustrated). The housing 6 is formed in a manner that the first fluid discharge port 65 and the second fluid discharge port 66 for discharging a fluid inside to the outside are open at the outer circumference of the housing. As illustrated in FIG. 1, the first fluid discharge port 65 may be connected to the fluid discharge piping 38. The fluid discharge piping 38 is formed to penetrate the first thrust bearing 3. The housing 6 may be formed to appropriately allow at least one fluid discharge port to be open at the outer circumferential surface of the housing 6.

The first screw groove 63 and the second screw groove 64 are formed at a part of the inner circumference of the housing 6. The first screw groove 63 is screwed with the screw groove 33 of the first thrust bearing 3. The first screw groove 63 and the screw groove 33 of the first thrust bearing 3 have the same screw pitch P1. The second screw groove 64 is screwed with the screw groove 43 of the second thrust bearing 4. The second screw groove 64 and the screw groove 43 of the second thrust bearing 4 have the same screw pitch P2.

Figure 2:
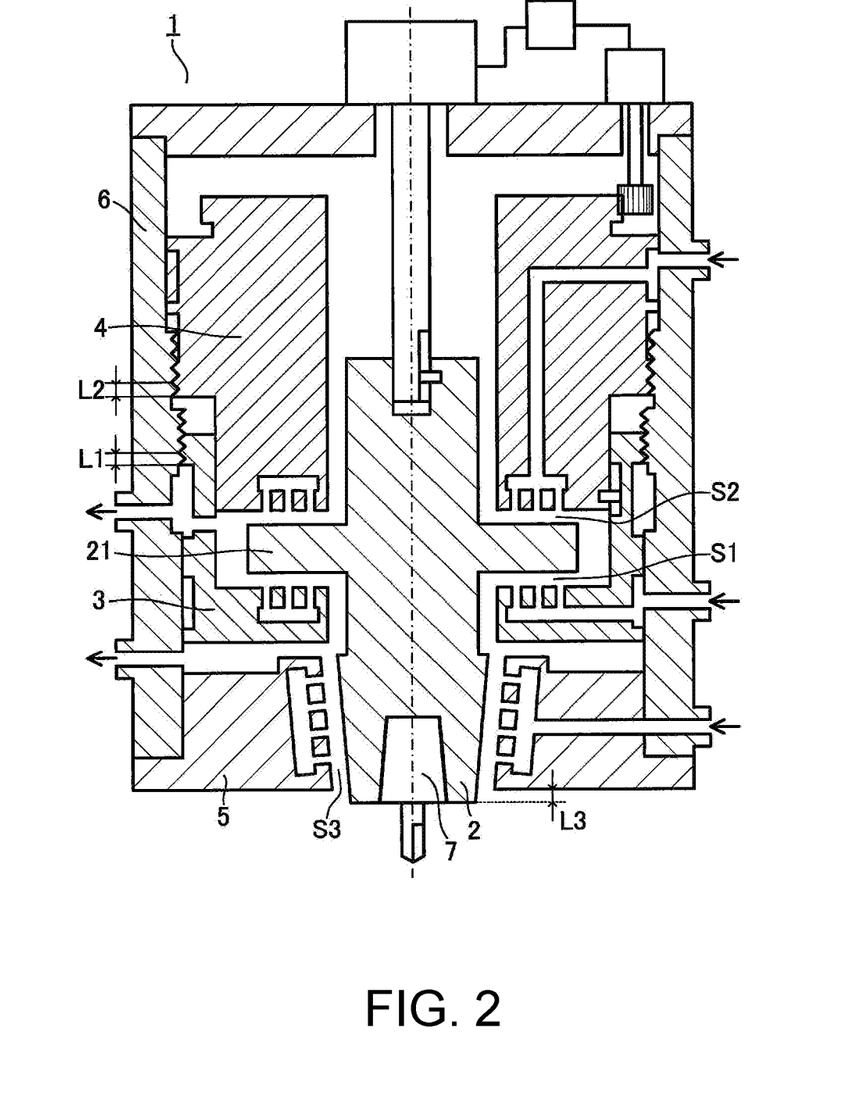
FIG. 2 is a front cross-sectional view schematically illustrating the hydrostatic bearing spindle device according to the first embodiment of the invention, in a state that the gap distance at the thrust loading side and the gap distance at the radial loading side are small.

In the hydrostatic bearing spindle device 1 of the first embodiment illustrated in FIGS. 1 and 2, the outer diameter of the tapered portion 20 gradually increases rearward. The first thrust bearing surface 30 of the first thrust bearing 3 faces the first thrust receiving surface 22 of the flange 21. The second thrust bearing surface 40 of the second thrust bearing 4 faces the second thrust receiving surface 23 of the flange 21. The screw pitch P2 of the second screw groove 64 is formed to be larger than the screw pitch P1 of the first screw groove 63.

$$P2>P1$$

The second thrust bearing 4 is rotated by a predetermined number of rotations R in a predetermined rotation direction by the thrust bearing rotation driving device 10 and moves frontward by a predetermined distance L2. The first thrust bearing 3 is rotated by the same number of rotations R in the same rotation direction as those of the second thrust bearing 4 by the rotation regulator 9 and moves frontward by a predetermined distance L1. The distance L2 by which the second thrust bearing 4 moves frontward is larger than the distance L1 by which the first thrust bearing 3 moves frontward.

$$L2=P2 \cdot R$$

$$L1=P1 \cdot R$$

$$L2>L1$$

The first gap S1 decreases by a distance $\Delta L$ which is a half of a distance obtained by subtracting the distance L1 from the distance L2. In addition, the second gap S2 also decreases by the distance $\Delta L$. In the hydrostatic bearing spindle device 1, it is possible to obtain high stiffness with respect to the thrust loading when the first gap S1 and the second gap S2 decrease.

$$\Delta L=(L2-L1)/2=R \cdot (P2-P1)/2$$

The spindle 2 is supported by the first thrust bearing 3 and the second thrust bearing 4 in a non-contact manner and thus moves frontward together with the first thrust bearing 3 and the second thrust bearing 4. The spindle 2 moves frontward by a distance L3 obtained by adding the distance $\Delta L$ to the distance L1 by which the first thrust bearing 3 moves frontward or by a distance L3 obtained by subtracting the distance $\Delta L$ from the distance L2 by which the second thrust bearing 4 moves frontward.

$$L3=L1+\Delta L$$

$$L3=L2-\Delta L$$

The tapered radial bearing surface 50a of the radial bearing 5 and the tapered radial receiving surface 20a of the spindle 2 are both inclined with respect to a direction in which the spindle 2 moves frontward. The third gap S3 decreases by a distance which is calculated based on the taper ratio T of the tapered portion 20 and the distance L3 by which the spindle 2 moves frontward. In general, it is preferable that the first gap S1, the second gap S2, and the third gap S3 have the same size. In the hydrostatic bearing spindle device 1, it is possible to obtain high stiffness with respect to the radial loading when the third gap S3 decreases.

When the spindle 2 is caused to move, all of the sizes of the first gap S1, the second gap S2, and the third gap S3 may increase or decrease by the same distance $\Delta L$. The screw pitch P1 of the first screw groove 63 and the screw pitch P2 of the second screw groove 64 may be formed to cause all of the first gap S1, the second gap S2, and the third gap S3 to increase or decrease by the same distance $\Delta L$ after the spindle 2 is caused to move. A relationship between the screw pitch P1 of the first screw groove 63 and the screw pitch P2 of the second screw groove 64 is as follows.

$$\frac{T}{\sqrt{4+T^2}}=\frac{P_2-P_1}{P_2+P_1}$$

For example, when the taper ratio T is 1/50 and the screw pitch P1 of the first screw groove 63 is 1.000 (mm), the screw pitch P2 of the second screw groove 64 is 1.020 (mm). In addition, for example, when the taper ratio T is 1/10 and the screw pitch P1 of the first screw groove 63 is 1.000 (mm), the screw pitch P2 of the second screw groove 64 is 1.105 (mm).

Figure 3:
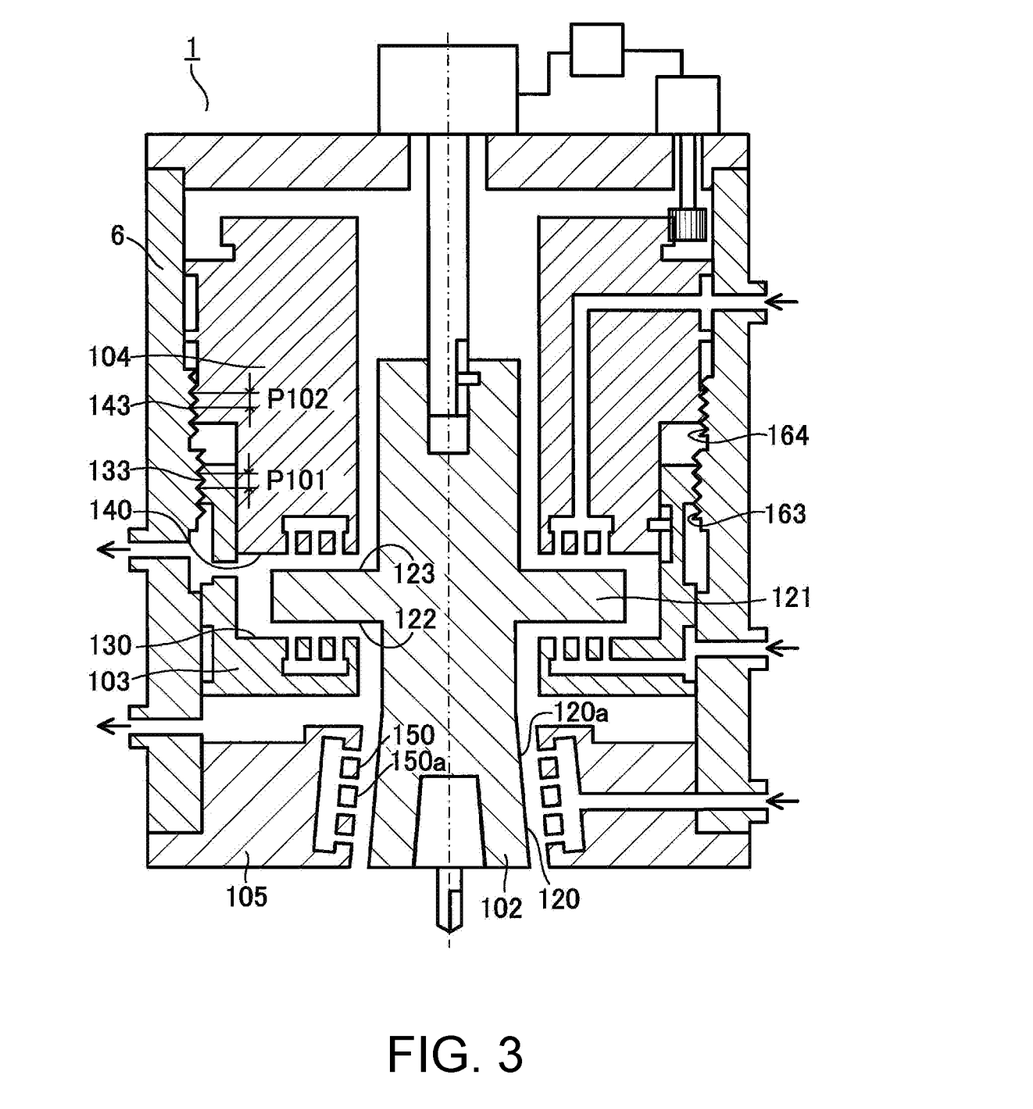
FIG. 3 is a front cross-sectional view schematically illustrating a hydrostatic bearing spindle device according to a second embodiment of the invention, in a state that a gap distance at a thrust loading side and a gap distance at a radial loading side are large.
Figure 4:
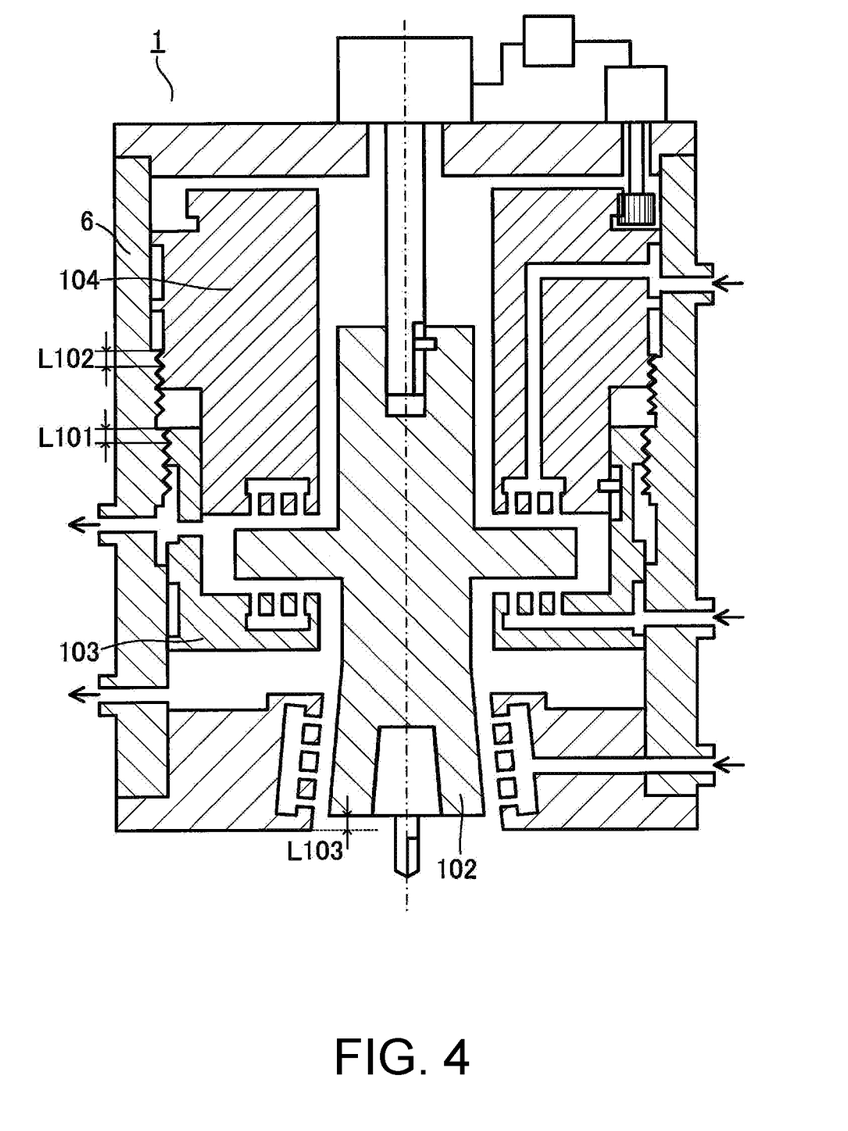
FIG. 4 is a front cross-sectional view schematically illustrating the hydrostatic bearing spindle device according to the second embodiment of the invention, in a state that the gap distance at the thrust loading side and the gap distance at the radial loading side are small.

A hydrostatic bearing spindle device 1 according to a second embodiment is described with reference to FIGS. 3 and 4. The hydrostatic bearing spindle device 1 includes a spindle 102, and a frustoconical tapered portion 120 expanding frontward is formed at a front end of the spindle 102. The tapered portion 120 has a tapered radial receiving surface 120a on an outer circumferential surface thereof. An outer diameter of the tapered portion 120 gradually increases frontward. An outer diameter of a tapered hole 150 of a radial bearing 105 also gradually increases frontward. The radial bearing 105 has a tapered radial bearing surface 150a, and the tapered radial bearing surface 150a and the tapered radial receiving surface 120*a* face each other in parallel. A first thrust bearing surface 130 of a first thrust bearing 103 faces a first thrust receiving surface 122 of a flange 121. A screw groove 133 is formed at a part of an outer circumferential surface of the first thrust bearing 103. A second thrust bearing surface 140 of a second thrust bearing 104 faces a second thrust receiving surface 123 of the flange 121. A screw groove 143 is formed at a part of an outer circumferential surface of the second thrust bearing 104. A first screw groove 163 and a second screw groove 164 are formed at a part of an inner circumference of a housing 6. A screw pitch P102 of the second screw groove 164 which is screwed with the screw groove 143 of the second thrust bearing 104 is formed to be smaller than a screw pitch P101 of the first screw groove 163 which is screwed with the screw groove 133 of the first thrust bearing 103.

$$P102 < P101$$

The first thrust bearing 103 and the second thrust bearing 104 rotate by a predetermined number of rotations r in a predetermined rotation direction and move rearward. A distance L102 by which the second thrust bearing 104 moves rearward is smaller than a distance L101 by which the first thrust bearing 103 moves rearward.

$$L102 = P102 \cdot r$$

$$L101 = P101 \cdot r$$

$$L102 < L101$$

The spindle 102 is supported by the first thrust bearing 103 and the second thrust bearing 104 in a non-contact manner and thus moves rearward together with the first thrust bearing 103 and the second thrust bearing 104. The spindle 102 moves rearward by a distance L103 which is calculated based on the distances L101 and L102. Except for that, the description of the same configurations as those of the above-described embodiment is omitted.

$$L103 = L102 + (L101 - L102)/2 = L101 - (L101 - L102)/2$$

The hydrostatic bearing spindle device 1 of the invention has a small and simple configuration, in which it is possible to easily adjust both a gap at a thrust loading side and a gap at a radial loading side. The gap at the thrust loading side indicates the first gap S1 and the second gap S2. The gap at the radial loading side indicates the third gap S3. Hence, the hydrostatic bearing spindle device 1 of the invention can cope with a wide variety of machining. On the one hand, when a machining load is low and the spindle 2 rotates at a high speed, the spindle 2 is caused to move to increase all of the first gap S1, the second gap S2, and the third gap S3 in order to reduce high frictional heat which is generated from the bearing due to the rotation at a high speed. On the other hand, when the machining load is high and the spindle 2 rotates at a low speed, the spindle 2 is caused to move to decrease all of the first gap S1, the second gap S2, and the third gap S3 in order to maintain high stiffness against the high machining load.

In addition, as will be described in a third embodiment illustrated in FIG. 5, in the hydrostatic bearing spindle device 1 of the invention, two or more tapered portions 20 and 20 may be formed on the spindle 2, and two or more radial bearings 5 and 5 may be included which support the respective tapered portions in a non-contact manner. The respective third gaps S3 and S3 of the two or more radial bearings 5 and 5 may have the same size. The two or more radial bearings 5 and 5 can support higher radial loading. Except for that, the description of the same configurations as those of the above-described embodiments is omitted.

The embodiment was chosen in order to explain the principles of the invention and its practical application. Many modifications and variations are possible in light of the above teachings. It is intended that the scope of the invention be defined by the claims.

What is claimed is:

1. A hydrostatic bearing type spindle device to which a tool or a workpiece is detachably fixed, the hydrostatic bearing type spindle device comprising:
    a spindle that is configured to have a front end to which the tool or the workpiece is detachably fixed and that comprises a tapered portion having a tapered radial receiving surface and a flange having a first thrust receiving surface and a second thrust receiving surface formed at a rear side from the first thrust receiving surface;
    a spindle rotation driving device that rotates the spindle;
    a first thrust bearing that has a first thrust bearing surface facing the first thrust receiving surface in parallel with a first gap formed therebetween and that is penetrated by the spindle;
    a second thrust bearing that has a second thrust bearing surface facing the second thrust receiving surface in parallel with a second gap formed therebetween and that is penetrated by the spindle;
    a radial bearing that has a tapered radial bearing surface facing the tapered radial receiving surface in parallel with a third gap formed therebetween and that is penetrated by the spindle;
    a rotation regulator that allows one of the first thrust bearing and the second thrust bearing to relatively move with respect to the other in an axial direction but regulates relative rotation of one with respect to the other; and
    a housing which has a first screw groove screwed with the first thrust bearing and a second screw groove screwed with the second thrust bearing and accommodates the spindle, the first thrust bearing, the second thrust bearing, and the radial bearing and to which the radial bearing is fixed,
    wherein the second screw groove has a larger screw pitch than the first screw groove does when the tapered portion expands rearward, and the first screw groove has a larger screw pitch than the second screw groove does when the tapered portion expands frontward.

2. The hydrostatic bearing type spindle device according to claim 1,
    wherein the rotation regulator has a key member which is fixed to the second thrust bearing and extends in a radial direction and a guide groove which is formed in the first thrust bearing and guides the key member in parallel with an axis of the spindle.

3. The hydrostatic bearing type spindle device according to claim 1, wherein
    two or more tapered portions are formed on an outer circumference of the spindle, and
    the hydrostatic bearing spindle device includes two or more radial bearings.

4. The hydrostatic bearing type spindle device according to claim 1,
    wherein a taper ratio of the tapered portion is 1/50 to 1/10.

5. The hydrostatic bearing type spindle device according to claim 1, further comprising a thrust bearing rotation driving device that rotates at least one of the first thrust bearing or the second thrust bearing.

6. The hydrostatic bearing type spindle device according to claim 5, further comprising
a control device that controls the thrust bearing rotation driving device.

7. The hydrostatic bearing type spindle device according to claim 1,
wherein the first gap, the second gap, and the third gap have the same size.

8. The hydrostatic bearing type spindle device according to claim 1, further comprising
a fluid supply device that supplies a fluid to each of the first gap, the second gap, and the third gap.

9. The hydrostatic bearing type spindle device according to claim 8, wherein
the housing has a first fluid supply port, a second fluid supply port, and a third fluid supply port,
the first thrust bearing has a first fluid outlet formed in the first thrust bearing surface and first fluid supply piping through which the first fluid outlet and the first fluid supply port are connected to each other,
the second thrust bearing has a second fluid outlet formed in the second thrust bearing surface and second fluid supply piping through which the second fluid outlet and the second fluid supply port are connected to each other,
the radial bearing has a third fluid outlet formed in the tapered radial bearing surface and third fluid supply piping through which the third fluid outlet and the third fluid supply port are connected to each other, and
the fluid supply device is connected to each of the first fluid supply port, the second fluid supply port, and the third fluid supply port.

10. A machine tool comprising the hydrostatic bearing type spindle device according to claim 1.

* * * * *